United States Patent
Uchino et al.

(10) Patent No.: US 9,781,732 B2
(45) Date of Patent: Oct. 3, 2017

(54) USER EQUIPMENT AND TRANSMISSION CONTROL METHOD

(71) Applicant: NTT DOCOMO, INC., Tokyo (JP)

(72) Inventors: Tooru Uchino, Tokyo (JP); Hideaki Takahashi, Tokyo (JP); Yuta Sagae, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 53 days.

(21) Appl. No.: 14/649,739

(22) PCT Filed: Dec. 4, 2013

(86) PCT No.: PCT/JP2013/082605
§ 371 (c)(1),
(2) Date: Jun. 4, 2015

(87) PCT Pub. No.: WO2014/091989
PCT Pub. Date: Jun. 19, 2014

(65) Prior Publication Data
US 2015/0312922 A1    Oct. 29, 2015

(30) Foreign Application Priority Data
Dec. 11, 2012  (JP) .................. 2012-270843

(51) Int. Cl.
*H04W 72/10*  (2009.01)
*H04W 16/32*  (2009.01)
(Continued)

(52) U.S. Cl.
CPC .......... *H04W 72/10* (2013.01); *H04L 5/0053* (2013.01); *H04L 5/1423* (2013.01); *H04W 16/32* (2013.01);
(Continued)

(58) Field of Classification Search
CPC ... H04W 72/10; H04W 16/32; H04W 36/005; H04W 72/04; H04W 72/1278; H04W 76/04
(Continued)

(56) References Cited

U.S. PATENT DOCUMENTS

2008/0298486 A1* 12/2008 Venturino ............. H04L 5/0007
375/260
2011/0287804 A1   11/2011 Seo et al.
(Continued)

FOREIGN PATENT DOCUMENTS

EP        2385647 A2    11/2011
EP        2487945 A1    8/2012
(Continued)

OTHER PUBLICATIONS

Extended European Search Report issued in corresponding European Application No. 13862072.9, mailed on Nov. 24, 2015 (8 pages).
(Continued)

*Primary Examiner* — Ronald B Abelson
(74) *Attorney, Agent, or Firm* — Osha Liang LLP

(57) ABSTRACT

A user equipment has a transmission and reception unit configured to transmit and receive a radio channel to/from a base station via multiple cells configured by carrier aggregation, a simultaneous transmission availability determination unit configured to, in response to an occurrence of an event to transmit an uplink control channel in the multiple cells simultaneously, determine whether the uplink control channel can be simultaneously transmitted in the multiple cells, and a transmission control unit configured to, if the uplink control channel can be simultaneously transmitted in the multiple cells, instruct the transmission and reception unit to transmit the uplink control channel in the multiple
(Continued)

cells simultaneously, and if the uplink control channel cannot be simultaneously transmitted in the multiple cells, control transmission of the uplink control channel in accordance with a transmission priority.

18 Claims, 3 Drawing Sheets

(51) Int. Cl.
| | |
|---|---|
| *H04W 36/00* | (2009.01) |
| *H04W 72/04* | (2009.01) |
| *H04W 72/12* | (2009.01) |
| *H04W 76/04* | (2009.01) |
| *H04L 5/00* | (2006.01) |
| *H04L 5/14* | (2006.01) |
| *H04W 52/34* | (2009.01) |
| *H04W 76/02* | (2009.01) |
| *H04W 84/02* | (2009.01) |
| *H04W 88/02* | (2009.01) |
| *H04W 88/08* | (2009.01) |

(52) U.S. Cl.
CPC ......... *H04W 36/005* (2013.01); *H04W 52/34* (2013.01); *H04W 72/1247* (2013.01); *H04W 72/1278* (2013.01); *H04W 76/025* (2013.01); *H04W 76/04* (2013.01); *H04W 84/025* (2013.01); *H04W 88/02* (2013.01); *H04W 88/08* (2013.01)

(58) Field of Classification Search
USPC ......................................................... 370/329
See application file for complete search history.

(56) References Cited

U.S. PATENT DOCUMENTS

| | | | |
|---|---|---|---|
| 2012/0039273 A1* | 2/2012 | Nam | ................. H04L 5/0005 370/329 |
| 2013/0039321 A1 | 2/2013 | Kim et al. | |
| 2014/0119304 A1* | 5/2014 | Li | ................. H04W 52/146 370/329 |

FOREIGN PATENT DOCUMENTS

| | | | | |
|---|---|---|---|---|
| JP | WO2012060067 | * | 5/2012 | ........... H04W 52/34 |
| WO | 2011/132993 A2 | | 10/2011 | |

OTHER PUBLICATIONS

International Search Report issued in PCT/JP2013/082605 mailed on Feb. 18, 2014 (1 page).
Written Opinion of the International Searching Authority issued in PCT/JP2013/082605 mailed on Feb. 18, 2014 (3 pages).
3GPP TS 36.213 V11.0.0; "3rd Generation Partnership Project; Technical Specification Group Radio Access Network; Evolved Universal Terrestrial Radio Access (E-UTRA); Physical layer procedures (Release 11)"; Sep. 2012 (143 pages).
Office Action dated Nov. 10, 2016 in corresponding European Patent Application No. 13862072.9 (6 pages).
Office Action mailed Jan. 17, 2017 in corresponding Japanese Patent Application No. 2012-270843 (with translation) (5 pages).
LG Electronics, 3GPP TSF RAN WG1 Meeting #67, "Aspect on Simultaneous Transmission of PRACH and UL Channels considering Multiple Timing Advance", R1-113910, San Francisco, USA, Nov. 14-18, 2011 (5 pages).
Huawei, HiSilicon, 3GPP TSF RAN WG1 Meeting #66bis, "Discussion on inter-band TDD CA with different UL-DL configurations", R1-112892, Zhuhai, China, Oct. 10-14, 2011 (5 pages).

* cited by examiner

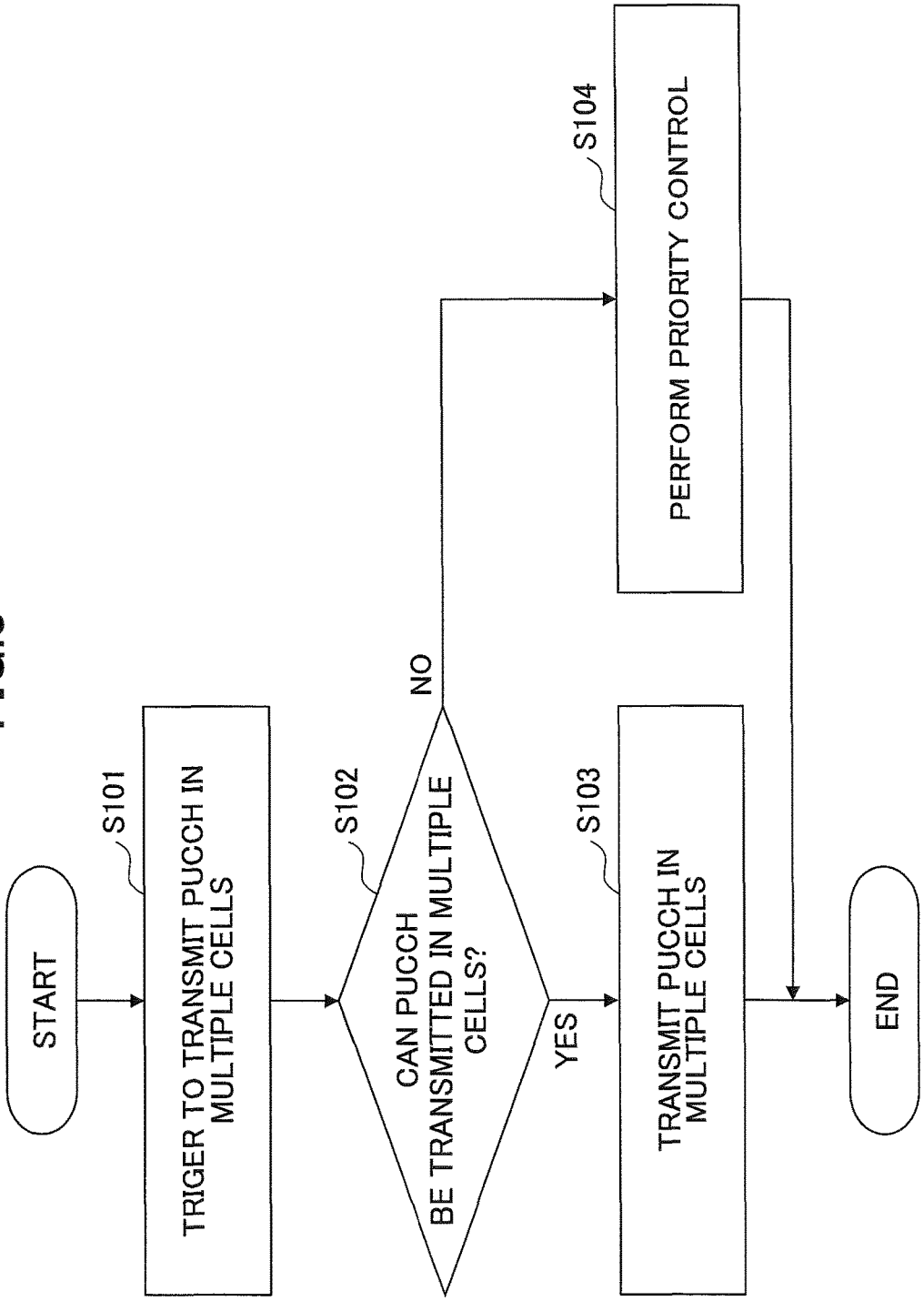

USER EQUIPMENT AND TRANSMISSION CONTROL METHOD

TECHNICAL FIELD

The present invention relates to a radio communication system using carrier aggregation.

BACKGROUND ART

As a future communication standard of LTE (Long Term Evolution), 3GPP ($3^{rd}$ Generation Partnership Project) is presently developing standardization of LTE-Advanced. In a LTE-Advanced system, a carrier aggregation (CA) technique is introduced to achieve a higher throughput than a LTE system while ensuring backward compatibility with the LTE system. In the carrier aggregation, a component carrier (CC) having the maximum bandwidth of 20 MHz supported by the LTE system is utilized as a basic component, and it is designed to achieve communications in a wider band by employing such multiple component carriers simultaneously.

In the carrier aggregation, a user equipment (UE) can communicate with abase station (evolved NodeB: eNB) by employing the multiple component carriers simultaneously. In the carrier aggregation, a primary cell (PCell) having high reliability for securing connectivity to a user equipment and a secondary cell (SCell) additionally configured to the user equipment being in connection to the primary cell are configured.

The primary cell is like a serving cell in the LTE system and is a cell to secure connectivity between the user equipment and a network. Specifically, in the primary cell, the user equipment can receive a PDCCH (Physical Downlink Control Channel) and a PDSCH (Physical Downlink Shared Channel) and transmit a PRACH (Physical Random Access Channel), a PUCCH (Physical Uplink Control Channel), a PUSCH (Physical Uplink Shared Channel) and a SRS (Sounding Reference Symbol). Also, if the user equipment changes the primary cell, the user equipment must perform handover. On the other hand, the secondary cell is a cell configured to the user equipment in addition to the primary cell. Addition and deletion of the secondary cell is performed by a configuration in RRC (Radio Resource Control).

See 3GPP TS 36.213 V.11.0.0 (2012-09) for the carrier aggregation, for example.

SUMMARY OF INVENTION

Problem to be Solved by the Invention

In the current carrier aggregation, among the above-stated uplink radio channels, the PRACH, the PUCCH, the PUSCH and the SRS, transmissions of the PRACH, the PUSCH and the SRS are supported in both the primary cell and the secondary cell. In this case, the user equipment can transmit the PRACH, the PUSCH and the SRS simultaneously in the primary cell and the secondary cell.

On the other hand, in the current carrier aggregation, transmission of the PUCCH is supported in the primary cell but is not supported in the secondary cell. In other words, the PUCCH is transmitted only in the primary cell, and the transmission of the PUCCH via the secondary cell is not specified. From this reason, when a large number of user equipments use a certain cell as the primary cell, the number of user equipments allowing for connection to the primary cell will be limited due to limitation of capacity of the PUCCH in that cell. Also, according to the inter-eNB CA or the inter-site CA as presently discussed, scheduling is performed by each base station, and the PUCCH must be accordingly transmitted for each of cells configured to the user equipment. From this reason, it is being discussed that transmission of the PUCCH can be supported not only in the primary cell but also in the secondary cell.

Even if the above-stated simultaneous transmissions of the PUCCH in the multiple cells are supported in a radio communication system, however, the user equipment cannot necessarily transmit the PUCCH in the multiple cells simultaneously. For example, if the user equipment does not support a capability of the uplink simultaneous transmission, the user equipment cannot transmit the PUCCH in multiple cells simultaneously. Alternatively, if the user equipment cannot ensure an amount of transmit power sufficient to perform the uplink simultaneous transmission, for example, if the user equipment resides at a cell edge, the user equipment cannot perform the uplink simultaneous transmission.

In such a case where the user equipment cannot transmit the PUCCH in multiple cells simultaneously, it may be considered to set priority of the PUCCH for transmission and transmit the PUCCH in accordance with the priority.

In light of the above-stated problem, one objective of the present invention is to provide a technique for transmitting uplink control channels in multiple cells simultaneously in a radio communication system supporting transmission of the uplink control channels in a secondary cell.

Means for Solving the Problem

In order to solve the above objective, one aspect of the present invention relates to a user equipment comprising: a transmission and reception unit configured to transmit and receive a radio channel to/from a base station via multiple cells configured by carrier aggregation; a simultaneous transmission availability determination unit configured to, in response to an occurrence of an event to transmit an uplink control channel in the multiple cells simultaneously, determine whether the uplink control channel can be simultaneously transmitted in the multiple cells; and a transmission control unit configured to, if the uplink control channel can be simultaneously transmitted in the multiple cells, instruct the transmission and reception unit to transmit the uplink control channel in the multiple cells simultaneously, and if the uplink control channel cannot be simultaneously transmitted in the multiple cells, control transmission of the uplink control channel in accordance with a transmission priority.

Advantage of the Invention

According to the above-mentioned aspects, it is possible to transmit uplink control channels in multiple cells simultaneously in a radio communication system supporting transmission of the uplink control channels in a secondary cell.

BRIEF DESCRIPTION OF DRAWINGS

FIG. 3 is a flowchart for illustrating a PUCCH transmission operation according to one embodiment of the present invention.

EMBODIMENTS OF THE INVENTION

Embodiments of the present invention are described below with reference to the drawings.

Summarizing the embodiments described below, when an event to transmit uplink control channels in multiple cells simultaneously occurs in a radio communication system using carrier aggregation, a user equipment determines whether the uplink control channels for transmission can be transmitted in the multiple cells simultaneously. If the uplink control channels for transmission can be transmitted in the multiple cells simultaneously, the user equipment transmits the uplink control channels for transmission to a base station via the multiple cells. On the other hand, if the uplink control channels for transmission cannot be transmitted in the multiple cells, the user equipment controls transmissions of the uplink control channel in accordance with a transmission priority, for example, by assigning a relatively large amount of transmit power to an uplink control channel with a higher transmission priority and assigning a relatively small amount of transmit power to an uplink control channel with a lower transmission priority or stopping the transmission.

The transmission priority may depend on types of the uplink control channels for transmission. The transmission priority may be also set depending on the type of applied carrier aggregation, that is, depending on either the intra-eNB carrier aggregation or the inter-eNB carrier aggregation being applied.

In this manner, even in the case where the uplink control channels for transmission cannot be transmitted in multiple cells simultaneously, simultaneous transmission of the uplink control channels becomes possible, and accordingly a base station can receive the uplink control channel with a higher transmission priority more reliably than the uplink control channel with a lower transmission priority.

Figure 1:
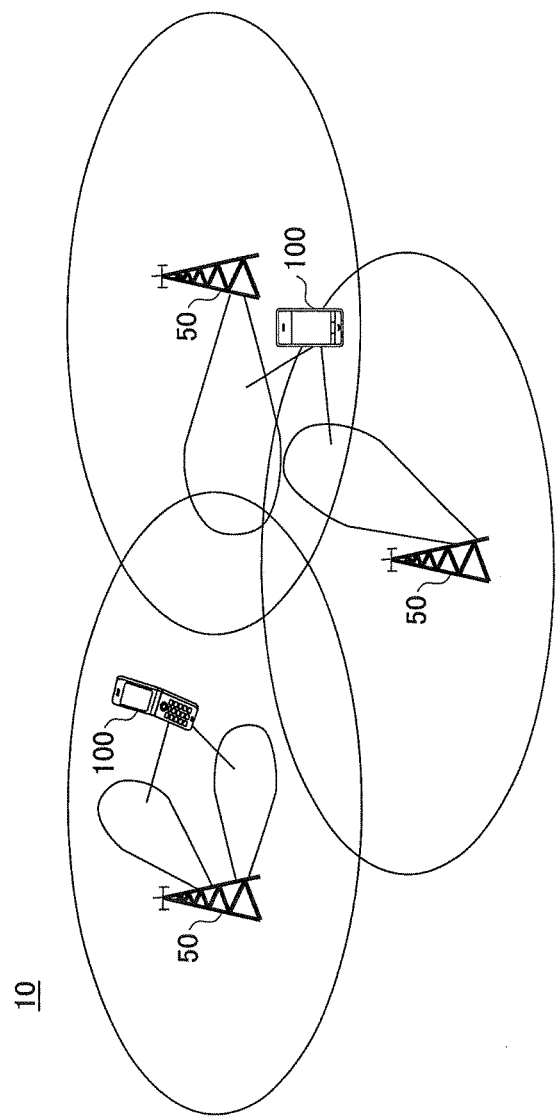
FIG. 1 is a diagram for schematically illustrating a radio communication system according to one embodiment of the present invention.

At the outset, a radio communication system according to one embodiment of the present invention is described with reference to FIG. 1. FIG. 1 is a diagram for schematically illustrating a radio communication system according to one embodiment of the present invention.

As illustrated in FIG. 1, a radio communication system 10 includes one or more base stations (eNBs) 50 and one or more user equipments (UEs) 100. In this embodiment, the radio communication system 10 is a LTE-Advanced system, but is not limited to it, and may be any appropriate radio communication system supporting the carrier aggregation.

In the radio communication system 10 according to this embodiment, the single base station 50 serves multiple cells to communicate with the user equipment 100 and communicates with the user equipment 100 via these cells by assigning a primary cell and a secondary cell from these cells to the user equipment 100 (intra-eNB CA).

Also, multiple base stations 50 serve multiple cells to communicate with the user equipment 100, and different base stations 50 assign a primary cell and a secondary cell to the user equipment 100 and communicate with the user equipment 100 via these cells (inter-eNB CA).

The base station 50 wirelessly connects to the user equipment 100 to transmit downlink data received from a communicatively connected upper station or server (not shown) to the user equipment 100 and to transmit uplink data received from the user equipment 100 to the upper station (not shown). In this embodiment, the base station 50 is an eNB in compliance with the LTE-Advanced, but is not limited to it, and may be any appropriate base station supporting the intra-eNB carrier aggregation and the inter-eNB carrier aggregation.

The user equipment 100 is typically a mobile phone, a smartphone, a tablet, a mobile router and so on, but is not limited to it, and may be any appropriate user equipment having a radio communication function. In a typical hardware arrangement, the user equipment 100 includes a CPU (Central Processing Unit) such as a processor, a memory device such as a RAM (Random Access Memory), an auxiliary storage device such as a hard disk device, a communication device for communicating wireless signals, an interface device for interfacing with a user and so on. Functions of the user equipment 100 as set forth may be implemented by loading data and programs, which are stored in the auxiliary storage device via the communication device and/or the interface device, to the memory device and then processing the data at the CPU in accordance with the loaded programs.

Figure 2:
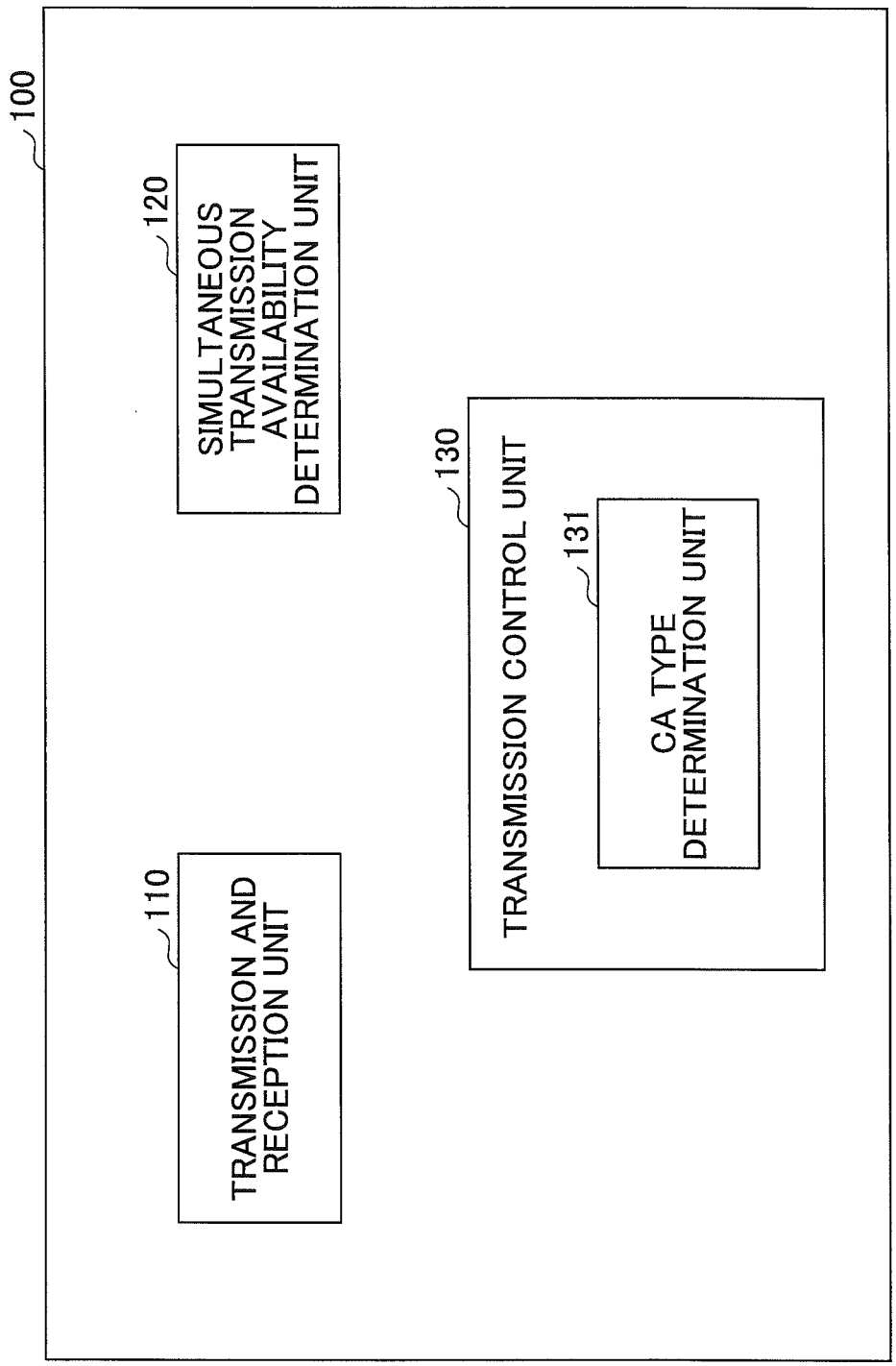
FIG. 2 is a diagram for illustrating an arrangement of a user equipment according to one embodiment of the present invention.

Next, an arrangement of the user equipment according to one embodiment of the present invention is described with reference to FIG. 2. FIG. 2 is a diagram for illustrating an arrangement of the user equipment according to one embodiment of the present invention.

As illustrated in FIG. 2, the user equipment 100 includes a transmission and reception unit 110, a simultaneous transmission availability determination unit 120 and a transmission control unit 130.

The transmission and reception unit 110 transmits and receives various radio channels such as uplink/downlink control channels and uplink/downlink data channels to/from the base station 50. In the radio communication system 10 complying with the LTE-Advanced, the user equipment 100 receives a PDCCH (Physical Downlink Control Channel) and a PDSCH (Physical Downlink Shared Channel) from the base station 50 and transmits a PRACH (Physical Random Access Channel), a PUCCH (Physical Uplink Control Channel), a PUSCH (Physical Uplink Shared Channel) and a SRS (Sounding Reference Symbol) to the base station 50.

In this embodiment, the radio communication system 10 supports carrier aggregation, and the base station 50 can communicate with the user equipment 100 via a primary cell and a secondary cell. For example, according to the intra-eNB carrier aggregation, the single base station 50 assigns a primary cell and a secondary cell to the user equipment 100 from multiple cells served by the base station 50 and communicates with the user equipment 100 via these cells. In this case, the transmission and reception unit 110 exchanges various radio channels with the base station 50 serving the cells. Also, according to the inter-eNB carrier aggregation, multiple base stations 50 assign a primary cell and a secondary cell to the user equipment 100 from respective cells and communicate with the user equipment 100 via these cells. In this case, the transmission and reception unit 110 exchanges various radio channels with the different base stations 50 serving the assigned cells. In general, according to the inter-eNB CA, the different base stations 50 use respective schedulers to assign their served cells to the user equipment 100. To this end, the respective base stations 50 would perform communication operations, such as scheduling, acknowledgement and radio quality measurement, with the user equipment 100 in parallel, and it is assumed that combinations of all uplink control information (UCI) such as a PUCCH-SR, a PUCCH-ACK/NACK and a PUCCH-CQI are transmitted simultaneously. Here, the PUCCH-SR is an uplink control channel for the user equipment 100 to issue a scheduling request to the base station 50, the PUCCH-ACK/NACK is an uplink control channel for the user equipment 100 to report whether the user equipment 100 has successfully received a data channel from the base station 50, and the PUCCH-CQI is an uplink control channel for the user equipment 100 to report radio quality such as a measured CQI (Channel Quality Indicator) to the base station 50.

The simultaneous transmission availability determination unit 120 determines, in response to an occurrence of an event to transmit an uplink control channel in multiple cells simultaneously, whether the uplink control channel can be simultaneously transmitted in the multiple cells. For example, this simultaneous transmission event may occur when the user equipment 100 transmits a scheduling request to the base station 50. Alternatively, the event may occur when the user equipment 100 receives a data channel from the base station 50 and transmits an acknowledgment indicative of whether the user equipment 100 has successfully received the data channel. Alternatively, the simultaneous transmission event may occur when the user equipment 100 is requested by the base station 50 to measure radio quality such as a CQI and report the measured radio quality or at periodic transmission timings of the radio quality.

In one embodiment, the simultaneous transmission availability determination unit 120 may determine whether the simultaneous transmission is available by determining whether the user equipment 100 has a capability of simultaneously transmitting an uplink control channel via multiple cells or whether that capability is configured. In another embodiment, the simultaneous transmission availability determination unit 120 may determine whether the simultaneous transmission is available by determining whether the user equipment 100 reserves an amount of transmit power sufficient for the simultaneous transmission. The simultaneous transmission availability determination unit 120 indicates a determination result to the transmission control unit 130.

The transmission control unit 130 controls transmission of an uplink control channel by the transmission and reception unit 110 in accordance with the received simultaneous transmission availability determination result. Specifically, if the uplink control channel can be simultaneously transmitted in the multiple cells, the transmission control unit 130 instructs the transmission and reception unit 110 to transmit the uplink control channel in the multiple cells simultaneously. On the other hand, if the uplink control channel cannot be simultaneously transmitted in the multiple cells, the transmission control unit 130 controls transmission of the uplink control channel in accordance with a configured transmission priority.

The phrase "transmission in accordance with the transmission priority" used herein may be to assign a relatively large amount of transmit power to an uplink control channel of a higher transmission priority and to assign a relatively small amount of transmit power to an uplink control channel of a lower transmission priority or stop the transmission. However, the present invention is not limited to it, and it may mean any appropriate transmission control for enabling the base station 50 to receive the uplink control channel having a higher transmission priority more reliably than the uplink control channel having a lower transmission priority.

In one embodiment, the transmission priority may be predefined in accordance with types of uplink control channels. In the radio communication system 10 complying with the LTE-Advanced, three types of PUCCHs, that is, a PUCCH-SR, a PUCCH-ACK/NACK and a PUCCH-CQI, are transmitted from the user equipment 100 to the base station 50.

For example, in a relationship between the PUCCH-SR and the PUCCH-ACK/NACK, the transmission priority may be set such that the PUCCH-SR is transmitted in priority over the PUCCH-ACK/NACK (PUCCH-SR>PUCCH-ACK/NACK). Also, the transmission priority may be set in the order of the PUCCH-SR, the PUCCH-ACK and the PUCCH-NACK (PUCCH-SR>PUCCH-ACK>PUCCH-NACK).

Also, in a relationship between the PUCCH-ACK/NACK and the PUCCH-CQI, the transmission priority may be set such that the PUCCH-ACK/NACK is transmitted in priority over the PUCCH-CQI (PUCCH-ACK/NACK>PUCCH-CQI). Also, the transmission priority may be set in the order of the PUCCH-ACK, the PUCCH-CQI and the PUCCH-NACK (PUCCH-ACK>PUCCH-CQI>PUCCH-NACK).

Also, in a relationship between the PUCCH-SR and the PUCCH-CQI, the transmission priority may be set such that the PUCCH-SR is transmitted in priority over the PUCCH-CQI (PUCCH-SR>PUCCH-CQI).

Note that the uplink control channels of the present invention are not limited to the PUCCH-SR, the PUCCH-ACK/NACK and the PUCCH-CQI as stated above and any other types of uplink control channels may be used. As can be understood from the above-stated examples, it is preferred that the transmission priority be basically specified to transmit more important uplink control channels in priority to implement radio communication between the base station 50 and the user equipment 100.

In another embodiment, the transmission priority of uplink control channels may be dynamically changed. For example, the transmission priority may be dynamically changed depending on a communication state between the base station 50 and the user equipment 100. In typical radio communication between the base station 50 and the user equipment 100, upon some communication demand arising at the user equipment 100, the user equipment 100 transmits a scheduling request to the base station 50. After scheduling, communications are initiated between the base station 50 and the user equipment 100. To this end, the transmission priority of the PUCCH-SR may be set to be higher before the communication initiation. On the other hand, after the communication initiation, the user equipment 100 receives a data channel from the base station 50 and/or transmits the data channel to the base station 50. To this end, the transmission priority of the PUCCH-ACK/NACK may be set to be higher after the communication initiation. Also, if the CQI reported from the user equipment 100 is less than or equal to a predefined threshold, there may be a higher likelihood of retransmission, and accordingly the transmission priority of the PUCCH-ACK/NACK may be set to be higher. Also, if an amount of variations of the measured CQI is larger than or equal to a predefined threshold, the transmission priority of the PUCCH-CQI may be set to be higher so that the user equipment 100 can follow variations of the radio quality quickly.

Also, the priority of the PUCCH-SR over the PUCCH-ACK/NACK and the PUCCH-CQI as stated above may be controlled, for example, based on a priority of data occurring at triggering transmission of the PUCCH-SR. For example, if the occurring data has a lower priority or a less rigorous latency requirement, the PUCCH-ACK/NACK and the PUCCH-CQI may have a priority over the PUCCH-SR.

In another embodiment, the transmission priority of uplink control channels may be indicated from the base station 50. In the radio communication system 10 complying with the LTE-Advanced, for example, the base station 50 may set the transmission priority of the PUCCH-SR, the PUCCH-ACK/NACK and the PUCCH-CQI for transmission and indicate the transmission priority to the user equipment 100. Also, the base station 50 may dynamically set the priority depending on communication state to the user equipment 100 and indicate the priority to the user equipment 100. For example, in the case where a large number of user equipments 100 are connecting to the base station 50, it may not be preferable that the base station 50 intensively receives one certain type of uplink control channel (such as the PUCCH-SR). In fact, upon receiving the PUCCH-SRs from the large number of user equipments 100 simultaneously, the base station 50 would temporarily have heavy processing load associated with scheduling. In order to avoid such a situation, for example, the base station 50 may divide the connecting user equipments 100 into multiple groups and set different transmission priorities for the different groups dynamically.

In another embodiment, the transmission priority may be set depending on component carriers or cells. For example, transmission of an uplink control channel in a primary cell may be prioritized over transmission of an uplink control channel in a secondary cell. For example, if the PUCCH-CQI is transmitted in multiple cells, the transmission priority may be set so that the PUCCH-CQI in the primary cell can be transmitted in priority over the PUCCH-CQI in the secondary cell (PCell CQI>SCell CQI).

Also, if two or more secondary cells are configured, the transmission priority among the secondary cells may be set in accordance with the order of communication quality in the secondary cells, indices of the secondary cells (SCellIndex) and so on. Here, SCellIndex is assigned whenever a secondary cell is assigned to the user equipment 100. For example, SCellIndex is set to 1 for the first-assigned secondary cell (SCellIndex=1), SCellIndex is set to 2 for the second-assigned secondary cell (SCellIndex=2), and so on.

Also, the transmission priority may be set in accordance with a communication scheme in a component carrier or a cell configured to the user equipment 100. For example, in accordance with which of TDD (Time Division Duplex) scheme or FDD (Frequency Division Duplex) scheme is used in the cell, a relatively higher transmission priority may be set for the TDD scheme cell, and a relatively lower transmission priority may be set for the FDD scheme cell.

In one embodiment, the transmission control unit 130 may have a CA type determination unit 131 configured to determine whether the user equipment 100 uses the intra-eNB carrier aggregation or the inter-eNB carrier aggregation. In this case, the transmission control unit 130 determines the transmission priority of the PUCCH-SR, the PUCCH-ACK/NACK and the PUCCH-CQI depending on whether the user equipment 100 uses the intra-eNB carrier aggregation or the inter-eNB carrier aggregation. For example, this CA type determination may be made by identifying the base station(s) 50 serving component carriers or cells assigned to the user equipment 100.

Depending on a CA type used by the user equipment 100, the transmission control unit 130 controls the transmission priority of various uplink control channels of the PUCCH-SR, the PUCCH-ACK/NACK and the PUCCH-CQI. If the user equipment 100 uses the intra-eNB CA, the transmission control unit 130 controls transmissions of the various uplink control channels in accordance with the above-stated transmission priority. In other words, the transmission control unit 130 determines the transmission priority of the uplink control channels in accordance with one or more of a transmission priority based on types of uplink control channels, a transmission priority indicated from the base station 50 and a transmission priority of multiple cells, and controls to transmit the uplink control channels to the base station 50 via the corresponding cells in accordance with the determined transmission priority.

On the other hand, if the user equipment 100 uses the inter-eNB CA, the transmission control unit 130 may further use various transmission priorities as set forth. In general, different base stations 50 and schedulers are used in the inter-eNB CA. From this reason, the respective base stations 50 will perform communication operations, such as scheduling, acknowledgement and radio quality measurement, with the user equipment 100 in parallel, and it is assumed that a combination of all uplink control information (UCI) such as the PUCCH-SR, the PUCCH-ACK/NACK and the PUCCH-CQI will be transmitted simultaneously.

In one embodiment, the base station 50 serving any cell connected by the user equipment 100 is configured as an anchor base station (eNB), and transmission of an uplink control channel to the anchor base station 50 may be prioritized. In other words, an uplink control channel transmitted to a component carrier or a cell served by the anchor base station 50 may be transmitted in priority over an uplink control channel transmitted to a component carrier or a cell served by a non-anchor base station 50'. For example, the uplink control channel transmitted to a component carrier or a cell served by the anchor base station 50 may be transmitted at a higher transmission power than the uplink control channel transmitted to a component carrier or a cell served by the non-anchor base station 50', or transmission of the uplink control channel to the component carrier or the cell served by the non-anchor base station 50' may be stopped.

The anchor base station 50 may be selected in accordance with any criteria. In one embodiment, the anchor base station 50 may be a base station having a primary cell configured. In another embodiment, the anchor base station 50 may be a base station serving a certain protocol layer collectively. In the LTE-Advanced system, for example, protocol layers of RRC (Radio Resource Control), PDCP (Packet Data Convergence Protocol), RLC (Radio Link Control), MAC (Medium. Access Control) and PHY are used, and the base station collectively serving certain one of these protocol layers may be configured as the anchor base station 50.

In another embodiment, the anchor base station 50 may be a base station having a SRB (Signaling Radio Bearer) configured. Alternatively, the anchor base station 50 may be a base station managing an interface to a core node. Alternatively, the anchor base station 50 may be a base station having security configured. In this case, the anchor base station 50 collectively performs security operations for communications between the user equipment 100 and the anchor base station 50 and other non-anchor base stations 50'.

In another embodiment, the anchor base station 50 may be a macro base station. In other words, in the LTE-Advanced system, a heterogeneous network (HetNet) where multiple types of base stations covering different cell radii are used is discussed. For example, a macro base station is used as a high power output type of base station covering a relatively large cell radius, and a pico base station is used as a low power output type of base station covering a relatively small cell radius. Alternatively, a femto base station for indoor use is used. The anchor base station 50 may be any of these different types of base stations.

In another embodiment, the anchor base station 50 may be a stand-alone type of base station that can provide a communication service to the user equipment 100 singularly.

In another embodiment, for example, if the inter-eNB CA is performed among three or more base stations 50, the priority may be set in the descending or ascending order of identifiers (indices) of the base stations 50.

In another embodiment, the transmission priority may be set in the goodness or badness order of radio quality between the user equipment 100 and the respective base stations 50. For example, the transmission priority may be set in the goodness or badness order of downlink or uplink radio quality.

In another embodiment, the priority may be set for each base station 50 in the radio communication system 10, and transmission of an uplink control channel to the respective base stations 50 may be controlled in accordance with the priorities.

In another embodiment, transmission of an uplink control channel to respective base stations 50 may be controlled in accordance with a priority of a bearer associated with communication in each component carrier or cell. For example, the priority of SRB data may be set to be the highest, the priority of high QoS (Quality of Service) data such as sound may be set to be the second highest, and finally the priority of low QoS data such as BE data may be set to be the lowest.

In another embodiment, transmission of an uplink control channel to respective base stations 50 may be controlled in accordance with average data rates available in the respective base stations 50. The average data rate can be measured by the user equipment 100.

In another embodiment, the transmission priority may be preset in accordance with types of uplink control channels. In the inter-eNB CA where different schedulers are used for scheduling, it is assumed that the PUCCH-SR may be simultaneously transmitted in multiple cells unlike the intra-eNB CA where a single scheduler is used for scheduling. If the PUCCH-SR cannot be simultaneously transmitted in the multiple cells in this situation, and accordingly the priority control is applied, some transmission priority must be set. For example, the PUCCH-SR having a lesser number of transmission times, that is, the PUCCH-SR having a lesser number of retransmission times, may be transmitted in priority. This is because it can be considered that a newer scheduling request may reflect a later communication demand of the user equipment 100.

Also, as stated above, different base stations 50 or schedulers are used in the inter-eNB CA. From this reason, the respective base stations 50 would perform communication operations, such as scheduling, acknowledgement and radio quality measurement, with the user equipment 100 in parallel, and it is assumed that a combination of all uplink control information (UCI) such as the PUCCH-SR, the PUCCH-ACK/NACK and the PUCCH-CQI may be simultaneously transmitted. In the inter-eNB CA where different schedulers are used for scheduling as stated above, it is assumed that the PUCCH-ACK/NACK may be simultaneously transmitted in multiple cells. If the PUCCH-ACK/NACK cannot be simultaneously transmitted in this situation and accordingly the priority control is applied, some transmission priority must be set. For example, the PUCCH-ACK may be transmitted in priority over the PUCCH-NACK. This is because it can be considered that if the base station 50 cannot receive the PUCCH-ACK within a predefined period even without receipt of the PUCCH-NACK, the base station 50 determines that reception has not been successful at the user equipment 100 and performs retransmission. Alternatively, if the PUCCH-NACK is transmitted, the priority may be controlled in consideration of how many times HARQ (Hybrid Automatic Repeat Request) has been performed until current transmission of the PUCCH-NACK. In one embodiment, the PUCCH-NACK for earlier HARQ may be transmitted in priority. In this case, for example, if the PUCCH-NACK for the third HARQ and the PUCCH-NACK for the fifth HARQ are considered, the PUCCH-NACK for the third HARQ may be transmitted in priority.

The above-stated various settings of transmission priority may be used singularly or in combination. For example, if the above embodiment where transmission to the anchor base station is prioritized is combined with the embodiment where SCellIndex is used, the transmission of an uplink control channel to the anchor base station is first prioritized, and then the transmission priority among non-anchor base stations may be set by using SCellIndex.

Next, a simultaneous transmission operation of an uplink control channel in the user equipment according to one embodiment of the present invention is described with reference to FIG. 3. FIG. 3 is a flow diagram for illustrating a PUCCH transmission operation according to one embodiment of the present invention.

As illustrated in FIG. 3, at step S101, the user equipment 100 detects any event for transmitting a PUCCH in multiple cells simultaneously. For example, the event may occur when the user equipment 100 has issued a scheduling request to the base station 50, when the user equipment 100 receives a data channel from the base station 50 and transmits an acknowledgement indicative of whether the data channel has been successfully received, or when the user equipment 100 has been requested by the base station 50 to measure radio quality such as a CQI and report the measured radio quality.

At step S102, in response to the event, the simultaneous transmission availability determination unit 120 determines whether the PUCCH can be simultaneously transmitted in multiple cells. In one embodiment, the simultaneous transmission availability determination unit 120 may determine whether the simultaneous transmission is available by determining whether a capability of simultaneously transmitting the PUCCH via the multiple cells has been configured to the user equipment 100. In another embodiment, the simultaneous transmission availability determination unit 120 may determine whether the simultaneous transmission is available by determining whether the user equipment 100 can reserve an amount of transmission power sufficient for simultaneous transmission.

If it is determined that the PUCCH can be simultaneously transmitted in the multiple cells (S102:Y), the flow proceeds to step S103, and the transmission control unit 130 instructs the transmission and reception unit 110 to simultaneously transmit the PUCCH in the multiple cells.

On the other hand, if it is not determined that the PUCCH can be simultaneously transmitted in the multiple cells (S102:N), the flow proceeds to step S104, and the transmission control unit 130 prioritizes the PUCCH for transmission in accordance with a transmission priority and instructs the transmission and reception unit 110 to transmit the PUCCH to the base station 50 in accordance with the priority.

In one embodiment, the transmission control unit 130 may determine which of the intra-eNB CA or the inter-eNB CA is applied and prioritize the PUCCH for transmission depending on the intra-eNB CA or the inter-eNB CA.

If the intra-eNB CA is applied, the transmission control unit 130 may determine the transmission priority of the PUCCH for transmission in accordance with one or more of a predefined or dynamically configured priority based on the type of PUCCH, a priority indicated from the base station 50 and a priority of cells, and transmit the PUCCH for transmission to the single base station 50 via the corresponding cell in accordance with the determined transmission priority.

On the other hand, if the intra-eNB CA is applied, the transmission control unit 130 determines the transmission priority of the PUCCH for transmission in accordance with one or more priorities of a priority for prioritizing the anchor base station 50, a priority based on the order of identifiers of respective base stations 50, a priority based on goodness of radio quality between the user equipment 100 and the respective base stations 50, priorities configured for the respective base stations 50, a priority of a bearer associated with the respective base stations 50 and average data rates available in the respective base stations, in addition to/instead of one or more of the predefined or dynamically configured priority based on the type of PUCCH, the priority indicated from the base station 50 and the priority of cells for use in the intra-eNB CA case, and transmit the PUCCH for transmission to connecting different base stations 50 via the corresponding cells in accordance with the determined transmission priority.

Although the embodiments of the present invention have been described above, the present invention is not limited to the above-stated specific embodiments, and various modifications and variations can be made within the spirit of the present invention as recited in claims.

This international patent application claims the benefit of priority based on Japanese Priority Application No. 2012-270843 filed on Dec. 11, 2012, the entire contents of which are hereby incorporated by reference.

LIST OF REFERENCE SYMBOLS

- 10: radio communication system
- 50: base station
- 100: user equipment
- 110: transmission and reception unit
- 120: simultaneous transmission availability determination unit
- 130: transmission control unit
- 131: carrier aggregation type determination unit

The invention claimed is:

1. A user equipment comprising:
a transmission and reception unit configured to transmit and receive a radio channel to/from a base station via multiple cells configured by carrier aggregation;
a simultaneous transmission availability determination unit configured to, in response to an occurrence of an event to transmit an uplink control channel in the multiple cells simultaneously, determine whether the uplink control channel can be simultaneously transmitted in the multiple cells; and
a transmission control unit configured to, if the uplink control channel can be simultaneously transmitted in the multiple cells, instruct the transmission and reception unit to transmit the uplink control channel in the multiple cells simultaneously, and if the uplink control channel cannot be simultaneously transmitted in the multiple cells, control transmission of the uplink control channel in accordance with a transmission priority, wherein the transmission control unit includes a carrier aggregation type determination unit configured to determine which of intra-eNB carrier aggregation or inter-eNB carrier aggregation is applied, and the transmission control unit sets the transmission priority depending on the determination.

2. The user equipment as claimed in claim 1, wherein if the intra-eNB carrier aggregation is applied, the transmission control unit determines the transmission priority of an uplink control channel in accordance with one or more of a priority based on a type of the uplink control channel, a priority indicated from the base station and a priority of the multiple cells and controls to transmit the uplink control channel to the base station via a corresponding cell in accordance with the determined transmission priority.

3. The user equipment as claimed in claim 2, wherein the type of the uplink control channel includes an uplink control channel for transmitting a scheduling request, an acknowledgement and a radio quality report, and the transmission priority follows an order of an uplink control channel for transmitting the scheduling request, an uplink control channel for transmitting the acknowledgement and an uplink control channel for transmitting the radio quality report.

4. The user equipment as claimed in claim 2, wherein the priority of the multiple cells is set such that the highest priority is assigned to a primary cell, and the priority among secondary cells follows an order of goodness of radio quality or indices assigned to the secondary cells.

5. The user equipment as claimed in claim 2, wherein the transmission control unit assigns a larger amount of transmit power to an uplink control channel having a higher transmission priority and assigns a smaller amount of transmit power to an uplink control channel having a lower transmission priority or stops the transmission.

6. The user equipment as claimed in claim 1, wherein if the inter-eNB carrier aggregation is applied, the transmission control unit prioritizes transmission of a scheduling request of a lesser number of transmission times among multiple scheduling requests simultaneously transmitted in the multiple cells.

7. The user equipment as claimed in claim 6, wherein the transmission control unit assigns a larger amount of transmit power to an uplink control channel having a higher transmission priority and assigns a smaller amount of transmit power to an uplink control channel having a lower transmission priority or stops the transmission.

8. The user equipment as claimed in claim 1, wherein if the inter-eNB carrier aggregation is applied, the transmission control unit prioritizes transmission of an ACK among multiple acknowledgements simultaneously transmitted in the multiple cells.

9. The user equipment as claimed in claim 8, wherein the transmission control unit assigns a larger amount of transmit power to an uplink control channel having a higher transmission priority and assigns a smaller amount of transmit power to an uplink control channel having a lower transmission priority or stops the transmission.

10. The user equipment as claimed in claim 1, wherein the transmission control unit assigns a larger amount of transmit power to an uplink control channel having a high transmission priority and assigns a smaller amount of transmit power to an uplink control channel having a lower transmission priority or stops the transmission.

11. The user equipment as claimed in claim 1, wherein the transmission control unit assigns a larger amount of transmit power to an uplink control channel having a higher transmission priority and assigns a smaller amount of transmit power to an uplink control channel having a lower transmission priority or stops the transmission.

12. A transmission control method in a user equipment for transmitting and receiving a radio channel to/from a base station via multiple cells configured by carrier aggregation, comprising:
    detecting an occurrence of an event to transmit an uplink control channel in the multiple cells simultaneously;
    determining whether the uplink control channel can be simultaneously transmitted in the multiple cells; and
    if the uplink control channel can be simultaneously transmitted in the multiple cells, transmitting the uplink control channel in the multiple cells simultaneously, and if the uplink control channel cannot be simultaneously transmitted in the multiple cells, controlling transmission of the uplink control channel in accordance with a transmission priority,
    determining which of intra-eNB carrier aggregation or inter-eNB carrier aggregation is applied, and setting the transmission priority depending on the determination.

13. The user equipment as claimed in claim 1, wherein if inter-eNB carrier aggregation is applied, the controlling comprises determining the transmission priority of an uplink control channel in accordance with one or more of a priority based on a type of the uplink control channel, a priority indicated from the base station, a priority of the multiple cells, a priority for prioritizing an anchor base station, a priority based on an order of identifiers of respective base stations, a priority based on goodness of radio quality between respective base stations and the user equipment, priorities configured for respective base stations, a priority of a bearer associated with respective base stations and average data rates available in respective base stations and controlling to transmit the uplink control channel to the base station via a corresponding cell in accordance with the determined transmission priority.

14. The user equipment as claimed in claim 13, wherein if the intra-eNB carrier aggregation is applied, the transmission control unit determines the transmission priority of an uplink control channel in accordance with one or more of a priority based on a type of the uplink control channel, a priority indicated from the base station and a priority of the multiple cells and controls to transmit the uplink control channel to the base station via a corresponding cell in accordance with the determined transmission priority.

15. The user equipment as claimed in claim 13, wherein the type of the uplink control channel includes an uplink control channel for transmitting a scheduling request, an acknowledgement and a radio quality report, and the transmission priority follows an order of an uplink control channel for transmitting the scheduling request, an uplink control channel for transmitting the acknowledgement and an uplink control channel for transmitting the radio quality report.

16. The user equipment as claimed in claim 15, wherein the transmission control unit assigns a larger amount of transmit power to an uplink control channel having a higher transmission priority and assigns a smaller amount of transmit power to an uplink control channel having a lower transmission priority or stops the transmission.

17. The user equipment as claimed in claim 13, wherein the priority of the multiple cells is set such that the highest priority is assigned to a primary cell, and the priority among secondary cells follows an order of goodness of radio quality or indices assigned to the secondary cells.

18. The user equipment as claimed in claim 17, wherein the transmission control unit assigns a larger amount of transmit power to an uplink control channel having a higher transmission priority and assigns a smaller amount of transmit power to an uplink control channel having a lower transmission priority or stops the transmission.

* * * * *